(12) United States Patent
Rockenbach (10) Patent No.: US 12,169,023 B2
(45) Date of Patent: Dec. 17, 2024

(54) HYBRID SHAFT SEAL ASSEMBLY FOR MOVABLE SHAFTS

(71) Applicant: Parker-Hannifin Corporation, Cleveland, OH (US)

(72) Inventor: Philip Rockenbach, Kalamazoo, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 18/253,631

(22) PCT Filed: Feb. 10, 2022

(86) PCT No.: PCT/US2022/015902
§ 371 (c)(1),
(2) Date: May 19, 2023

(87) PCT Pub. No.: WO2022/173892
PCT Pub. Date: Aug. 18, 2022

(65) Prior Publication Data
US 2024/0003423 A1     Jan. 4, 2024

Related U.S. Application Data

(60) Provisional application No. 63/229,281, filed on Aug. 4, 2021, provisional application No. 63/148,628, filed on Feb. 12, 2021.

(51) Int. Cl.
*F16J 15/34*     (2006.01)
(52) U.S. Cl.
CPC .......... *F16J 15/3452* (2013.01); *F16J 15/346* (2013.01)
(58) Field of Classification Search
CPC .... F16J 15/164; F16J 15/3448; F16J 15/3452; F16J 15/346; F16J 15/3464; F16J 15/3472; F16J 15/348; F16J 15/38
See application file for complete search history.

(56) References Cited

U.S. PATENT DOCUMENTS 2,839,317 A    6/1958   Haake
4,243,230 A    1/1981   Baker et al.
(Continued)

FOREIGN PATENT DOCUMENTS

EP    3376078 A1    9/2018
EP    3623669 A1    3/2020
JP    S5943266 A    3/1984

OTHER PUBLICATIONS

International Search Report and Written Opinion of the International Searching Authority for corresponding International Patent Application No. PCT/US2022/015902, mailed Apr. 26, 2022.
(Continued)

*Primary Examiner* — Nicholas L Foster
(74) *Attorney, Agent, or Firm* — Renner, Otto, Boisselle & Sklar, LLP (57) ABSTRACT

A shaft seal assembly for sealing a moving shaft of a fluid consumer includes a seal case movable relative to a mating surface of the shaft, a biasing force that biases the seal case towards the mating surface, and a seal at least partially disposed in the seal case. In a dynamic condition, when fluid pressure against the seal case is equal to or greater than a threshold pressure, the seal case sealingly separates from the mating surface, and the seal is forced into sealing engagement against the mating surface of the shaft to form a dynamic seal. In a static condition, when fluid pressure exerted against the seal case is less than the threshold pressure, the seal is sealingly engaged against the mating surface to form a static seal, and the seal case is sealingly engaged against the mating surface of the shaft to form an additional static seal.

15 Claims, 7 Drawing Sheets

(56) References Cited

U.S. PATENT DOCUMENTS

| | | | |
|---|---|---|---|
| 6,547,250 B1 | 4/2003 | Noble et al. | |
| 11,187,326 B2* | 11/2021 | Moriya | F16J 15/348 |
| 2007/0262532 A1* | 11/2007 | Ohama | F16J 15/3404 |
| | | | 277/390 |
| 2014/0264137 A1 | 9/2014 | Linser | |
| 2018/0106378 A1* | 4/2018 | Itadani | F16J 15/34 |
| 2018/0306327 A1 | 10/2018 | Itadani et al. | |
| 2020/0166142 A1 | 5/2020 | Bidkar et al. | |
| 2020/0200275 A1* | 6/2020 | Moriya | F16J 15/348 |

OTHER PUBLICATIONS

International Preliminary Report on Patentability of the Preliminary Examining Authority for corresponding International Patent Application No. PCT/US2022/015902, mailed Feb. 7, 2023.

Parker O-Ring Handbook, ORD 5700, pp. 1-5, retrieved from the internet on May 17, 2023: https://www.parker.com/content/dam/Parker-com/Literature/O-Ring-Division-Literature/ORD-5700.pdf.

* cited by examiner

Fig. 1A
(Conventional)

Fig. 1B
(Conventional)

HYBRID SHAFT SEAL ASSEMBLY FOR MOVABLE SHAFTS

RELATED APPLICATIONS

This application is a national phase of International Application No. PCT/US2022/015902 filed Feb. 10, 2022, which claims the benefit of U.S. Provisional Application No. 63/148,628 filed Feb. 12, 2021, and U.S. Provisional Application No. 63/229,281 filed Aug. 4, 2021, each of which is hereby incorporated herein by reference in its entirety.

TECHNICAL FIELD

The present disclosure relates to a seal, and more particularly to a hybrid shaft seal assembly for a movable shaft, as may be used in a fluid consumer such as a pump.

BACKGROUND

Shaft seal assemblies are used to seal against movable shafts of fluid consumers, such as pumps, to contain the operating fluid within the housing of the fluid consumer. Existing shaft seal assemblies generally include a seal case that houses both a nose seal and a spring that pushes the nose seal into engagement with a mating ring mounted on the shaft. The shaft seal assembly is configured to prevent leakage during both static conditions (e.g., when the shaft is not moving or when internal pressure is relatively low) and dynamic conditions (e.g., when the shaft is moving relative to an axis of the shaft). During static conditions, fluid leakage across the seal assembly is limited by a static seal which is formed by the spring forcing the nose seal into contact with the mating surface of the shaft. During dynamic conditions, fluid from the fluid consumer enters the seal case and exerts pressure on the nose seal to create an additional force that pushes the nose seal and mating ring into dynamic sealing contact with each another.

SUMMARY

In conventional shaft seal assemblies of the type described above, the spring usually is selected to have a low spring force to limit the contact pressure between the nose seal and shaft mating ring, since more contact pressure from the spring generally increases wear of the nose seal and mating ring during dynamic conditions. Thus, although a higher spring force may provide a better seal, it also may result in a decrease in the life of the components, which can lead to leakage and warranty returns. However, the low spring force comes at the cost of increasing static leakage at the interface when fluid pressure is low.

An aspect of the present disclosure provides a shaft seal assembly that improves upon conventional designs by using the seal case as an additional seal interface with the shaft mating surface during static conditions, which this seal case is then sealingly separated from the mating surface of the shaft during dynamic conditions to minimize wear.

In exemplary embodiments, the static seal provided by the seal case is actuated by a biasing member, such as a spring, which is disposed outside of the seal case to force the seal case against the mating surface of the shaft. The biasing member may at least partially set a threshold condition in which the seal case is engaged with or disengaged from the mating surface of the shaft. The seal case is adapted to receive fluid from the fluid consumer which generates fluid pressure that exerts a force opposite the force of the biasing member. In a state when the fluid pressure is low, such as when the fluid consumer is off, the biasing force of the biasing member exceeds the force from fluid pressure in the seal case, which causes the seal case to sealingly engage the mating surface of the shaft to enhance static sealing. In a state when the fluid pressure is elevated, such as when the fluid consumer is on, the fluid pressure in the seal case exceeds the biasing force of the biasing member, thereby causing the seal case to sealingly separate from the mating surface of the shaft to minimize wear. The fluid pressure in the seal case pushes a separate seal within the seal case against the mating surface of the shaft to create a suitable dynamic seal. Alternatively or additionally, the biasing force may be provided by a source of fluid pressure that is opposite the first fluid force that acts on the seal case.

Such an exemplary hybrid design enables enhanced static sealing with the seal case, which the seal case conventionally could not be used due to its causing excessive wear at high rotational speeds, but which the seal case is usable to provide static sealing in the exemplary design because the seal case sealingly separates from the shaft mating surface when fluid pressure and shaft speed increase. Accordingly, biasing load on the static seal can be increased substantially without impacting wear on the dynamic seal.

According to an aspect, a fluid consumer includes: a housing for containing an operating fluid; a shaft movable relative to the housing; and a shaft seal assembly configured to seal against a mating surface of the shaft to restrict leakage from a fluid-side of the consumer, the shaft seal assembly comprising: a seal case movable relative to the mating surface of the shaft; a biasing force that biases the seal case towards the mating surface of the shaft; and a seal at least partially disposed in the seal case, the seal being configured to seal against the mating surface of the shaft; wherein the consumer is configured such that: when in use, fluid pressure from the fluid-side exerts a fluid force against the seal case that is opposite the biasing force, when fluid pressure exerted against the seal case is equal to or greater than a threshold pressure, (i) the fluid force against the seal case overcomes the biasing force such that the seal case sealingly separates from mating surface of the shaft, and (ii) the fluid pressure from the fluid-side also exerts a force against the seal that forces the seal into sealing engagement against the mating surface of the shaft to form a dynamic seal; and when fluid pressure exerted against the seal case is less than the threshold pressure, (i) the seal is sealingly engaged against the mating surface of the shaft to form a static seal, and (ii) the biasing force overcomes the fluid force against the seal case, such that a sealing surface of the seal case is sealingly engaged against the mating surface of the shaft to form an additional static seal.

According to another aspect, a shaft seal assembly for sealing against a mating surface of a movable shaft of a fluid consumer includes: a seal case moveably mountable relative to the mating surface of the shaft; and a seal at least partially disposed in the seal case, the seal being configured to seal against the mating surface of the shaft; wherein the shaft seal assembly is configured such that: when fluid pressure exerted against the seal case is less than a threshold pressure, the seal case sealingly engages the mating surface of the shaft to provide a static seal; and when fluid pressure exerted against the seal case is equal to or greater than the threshold pressure, the seal case is sealingly separated from the mating surface of the shaft and the seal sealingly engages the mating surface of the shaft to provide a dynamic seal.

According to another aspect, a shaft seal assembly for sealing against a mating surface of a movable shaft of a fluid consumer includes: a seal case moveably mountable relative to the mating surface of the shaft, the seal case including a radially inner wall, a radially outer wall, and a back wall connecting the radially inner and outer walls, the respective walls having an interior portion and an exterior portion, the interior portion forming an annular channel, wherein the radially inner wall has an end face including a sealing surface for engaging the mating surface of the shaft; a spring configured to exert a spring force against the seal case, the spring being mountable outside of interior portion of the seal case to operatively engage the back wall of the seal case for biasing the seal case towards the mating surface of the shaft; and a nose seal at least partially disposed in the seal case, the nose seal having an axially projecting nose portion and a radially enlarged portion axially offset from the nose portion, the nose portion having a flat sealing surface that is configured to sealingly engage the mating surface of the shaft, and the enlarged portion forming at least one passage for communicating fluid to an internal fluid chamber formed between a backside of the seal and the back wall of the seal case.

The following description and the annexed drawings set forth certain illustrative embodiments of the invention. These embodiments are indicative, however, of but a few of the various ways in which the principles and aspects of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present invention have particular application to shaft seal assemblies for pumps, such as axial piston pumps, and thus will be described below chiefly in this context. It is understood, however, that the principles and aspects according to the invention may be applicable to other devices including fluid consumers, generally, where it is desirable to enhance static sealing functionality while also minimizing wear in a dynamic sealing mode. Such fluid consumers may include, but are not limited to, pumps, motors, or actuators, which may operate with hydraulic fluid, and which contain a moving member, such as a rotary or reciprocating shaft, against which the shaft sealing assembly provides static and dynamic sealing.

Figure 1A:
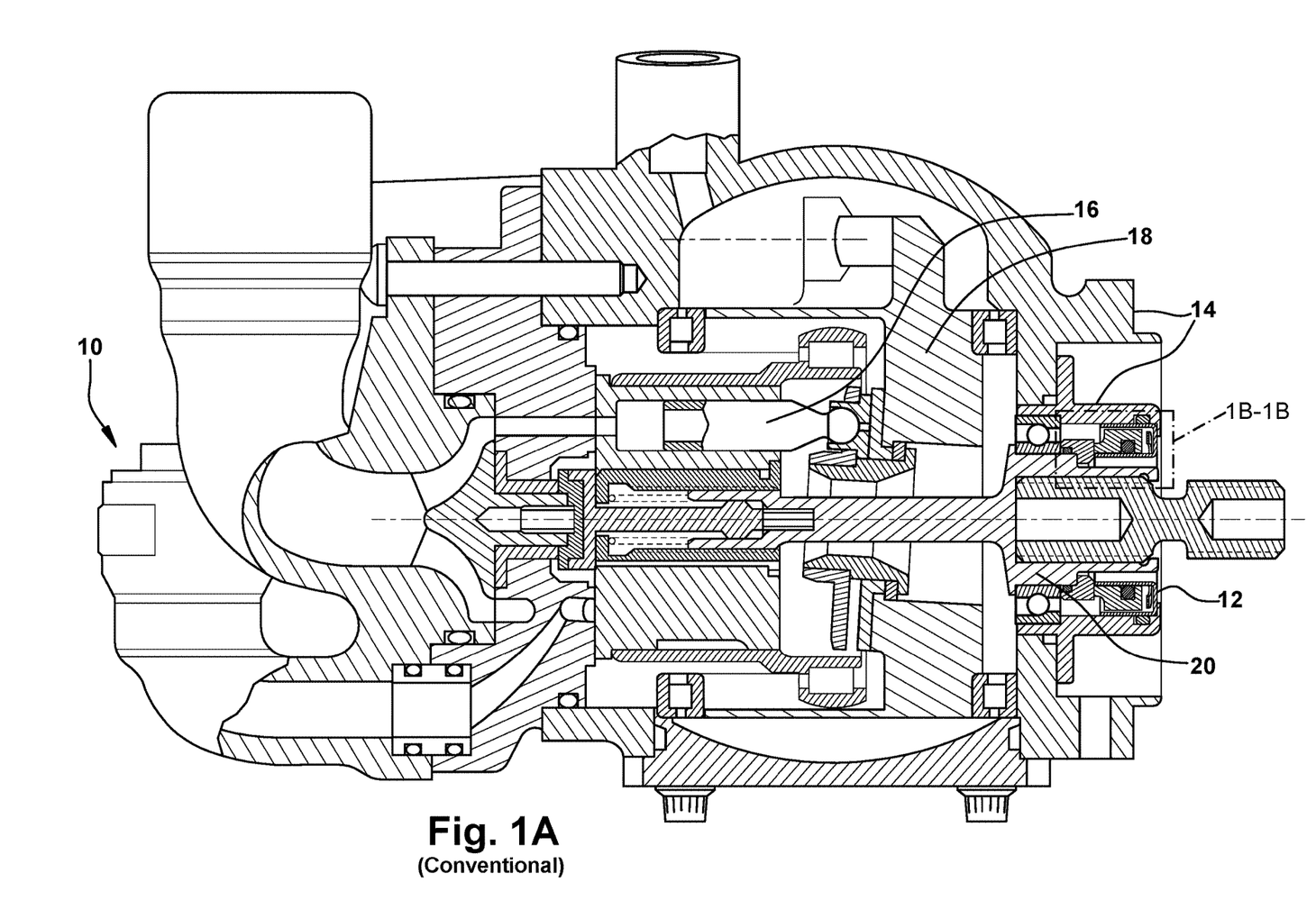
FIG. 1A is a cross-sectional side view of a conventional pump which utilizes a conventional shaft seal assembly.
Figure 1B:
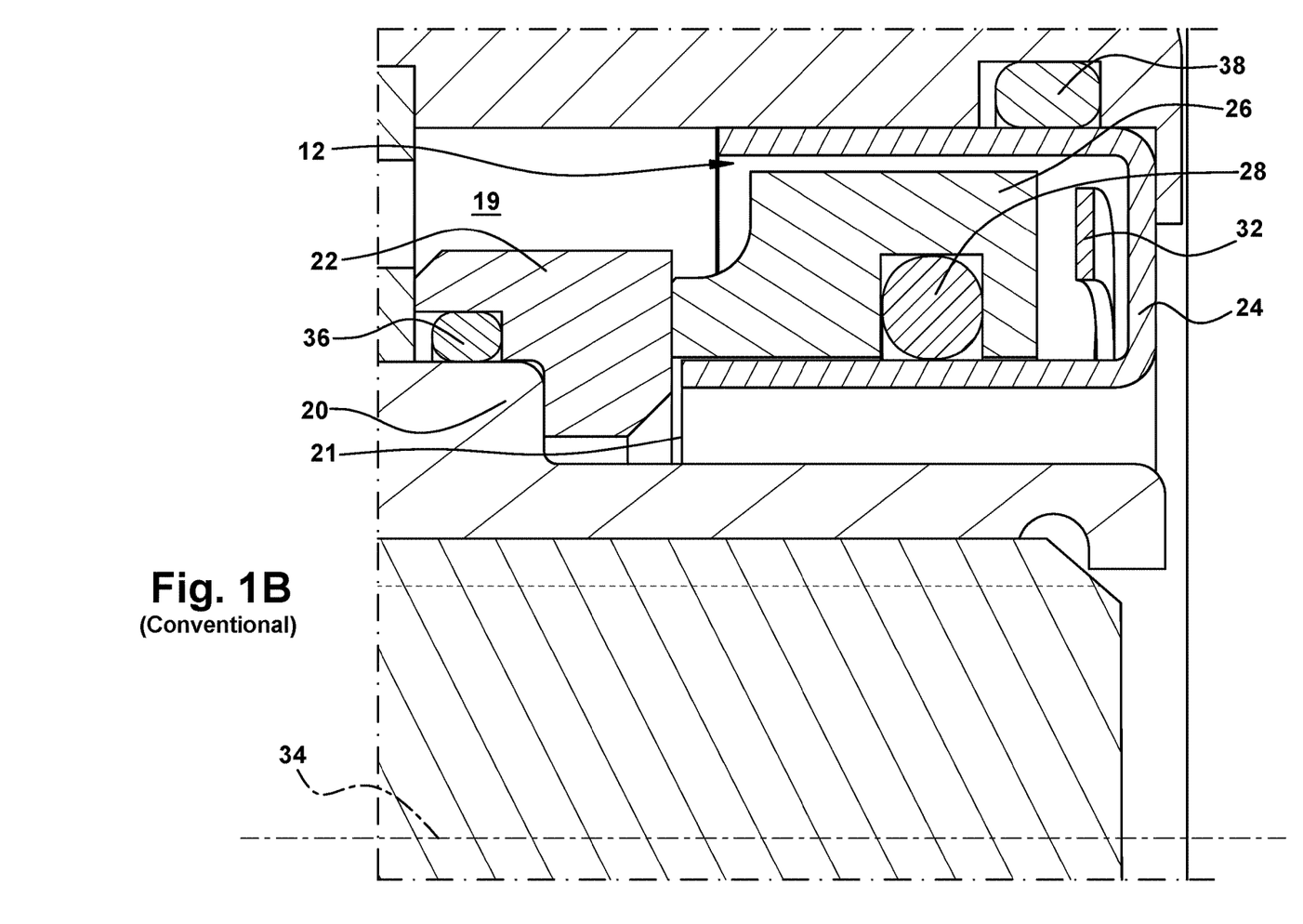
FIG. 1B is a partial cross-sectional view of the conventional shaft seal assembly taken from section 1B-1B in FIG. 1A.

Referring initially to FIGS. 1A and 1B, a conventional hydraulic axial-piston pump 10 is shown containing a conventional shaft seal assembly 12. As shown in FIG. 1A, the pump generally includes a housing 14 containing a valve plate against which a piston rotating group rotates. The housing may be a of multi-piece structure, as shown. The piston rotating group includes a plurality of pistons 16 that interact with a displaceable swashplate 18 that is configured to displace within a particular displacement angle range. As the piston rotating group rotates, the interaction of the pistons 16 against the swashplate 18 creates an axial motion of the pistons that forces hydraulic fluid through hydraulic porting to the downstream components of the system. Generally, the displacement of the pump 10 (volume per revolution) is varied by controlling the angle of the swashplate 18 to meet the demands of the hydraulic system. An input shaft 20, which is driven by a prime mover, drives the rotation of the piston rotating group to pump the hydraulic fluid in a well-known manner.

Turning to FIG. 1B, the conventional shaft seal assembly 12 is shown in further detail. As shown, the conventional shaft seal assembly 12 interfaces against a mating ring 22 mounted to the pump shaft 20 to prevent leakage of fluid from a fluid-side 19 (inside the pump housing 14) to a side 21 other than the fluid-side (e.g., a non-fluid side 21 outside the pump housing 14). The conventional shaft seal assembly 12 includes a seal case 24 that contains a nose seal 26, packing 28 and a spring 32. The shaft seal assembly 12 is configured to prevent leakage during both static conditions (e.g., when the shaft 20 is not rotating or when internal pressure is relatively low) and dynamic conditions (e.g., when the shaft 20 is rotating about an axis 34 of the shaft). The nose seal 26 is used to provide such sealing functionality in both the static and dynamic conditions by sealingly interfacing with the mating ring 22. Immediately adjacent to the nose seal 26 is the elastomeric packing 28 which translates parallel to the shaft axis 34. The elastomeric packing 28 prevents leakage from behind the nose seal 26 and allows the nose seal to maintain contact with the mating ring 22. As shown, additional static packings 36, 38 at the housing 14 and shaft 20 prevent fluid leakage from the pressurized housing into which the shaft seal assembly 12 is installed.

During static conditions, fluid leakage is limited by a static seal which is formed by the spring 32 forcing the nose seal 26 into contact with the mating ring 22 of the shaft 20. During dynamic conditions, however, fluid (e.g., hydraulic fluid) enters the seal case 24 behind the nose seal 26, such that fluid pressure on both the nose seal 26 and mating ring 22 create an additional force that pushes the nose seal 26 and mating ring 22 into contact with each another. The sealing interface of the design uses non-elastomeric materials (e.g. metals, ceramics, or the like) for both the nose seal 26 and mating ring 22 to improve wear characteristics for high rotational speeds.

To minimize leakage of the fluid from the pump 10, the conventional shaft seal assembly 12 relies on flat, smooth contact surfaces on both the nose seal 26 and mating ring 22. Over time, the contact pressure created by the spring 32 and fluid pressure coupled with the rotational motion of the shaft 20 wear the nose seal 26 and mating ring 22. This can cause loss of flatness and surface finish ultimately leading to leakage. Increased contact pressure either from increased spring force or increased fluid pressure increase the rate of this wear and decrease the useful life of the shaft seal assembly 12. For this reason, the spring force provided by the spring 32 is intentionally limited to prevent excessive wear. But this is at the cost of increasing leakage at the interface between the nose seal 26 and mating ring 22 when in a static state (i.e., when fluid pressure is low and/or when the shaft is not rotating).

An aspect of the present disclosure provides an exemplary shaft seal assembly that improves upon the conventional design shown in FIG. 1B. More specifically, the exemplary shaft seal assembly provides enhanced static sealing by using the seal case to form a static seal, which the seal case conventionally could not be used due to its causing excessive wear with the mating ring at high rotational speeds. The seal case is usable to provide such static sealing in the exemplary design by virtue of a configuration that allows the seal case to sealingly separate from the shaft mating surface during normal pump operation. Accordingly, in the exemplary design, seal load in the static seal state can be increased substantially without impacting wear in the dynamic seal state.

Figure 2A:
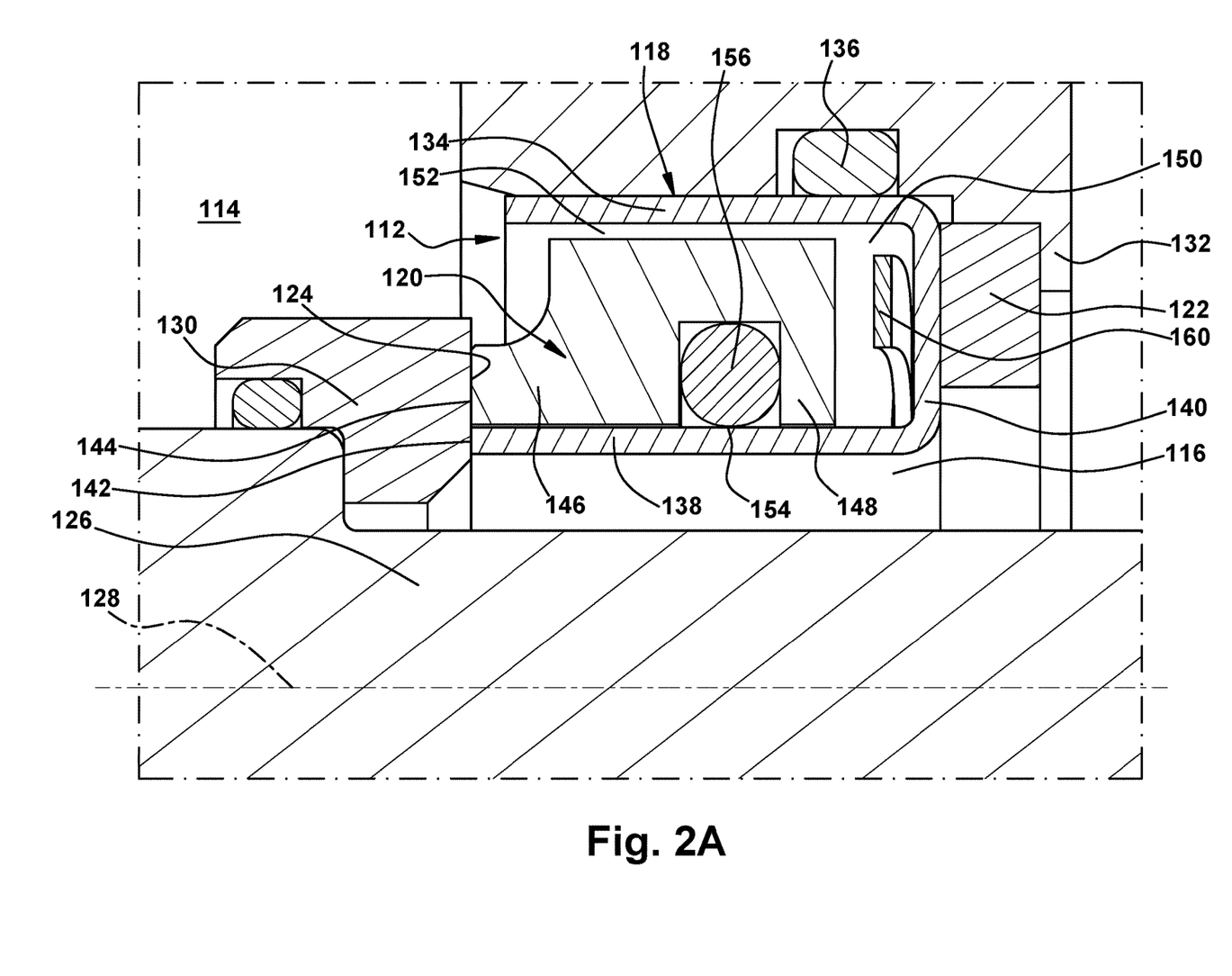
FIG. 2A is a partial cross-sectional view of an exemplary shaft seal assembly in accordance with an embodiment of the invention, which is shown in an exemplary static state.
Figure 2B:
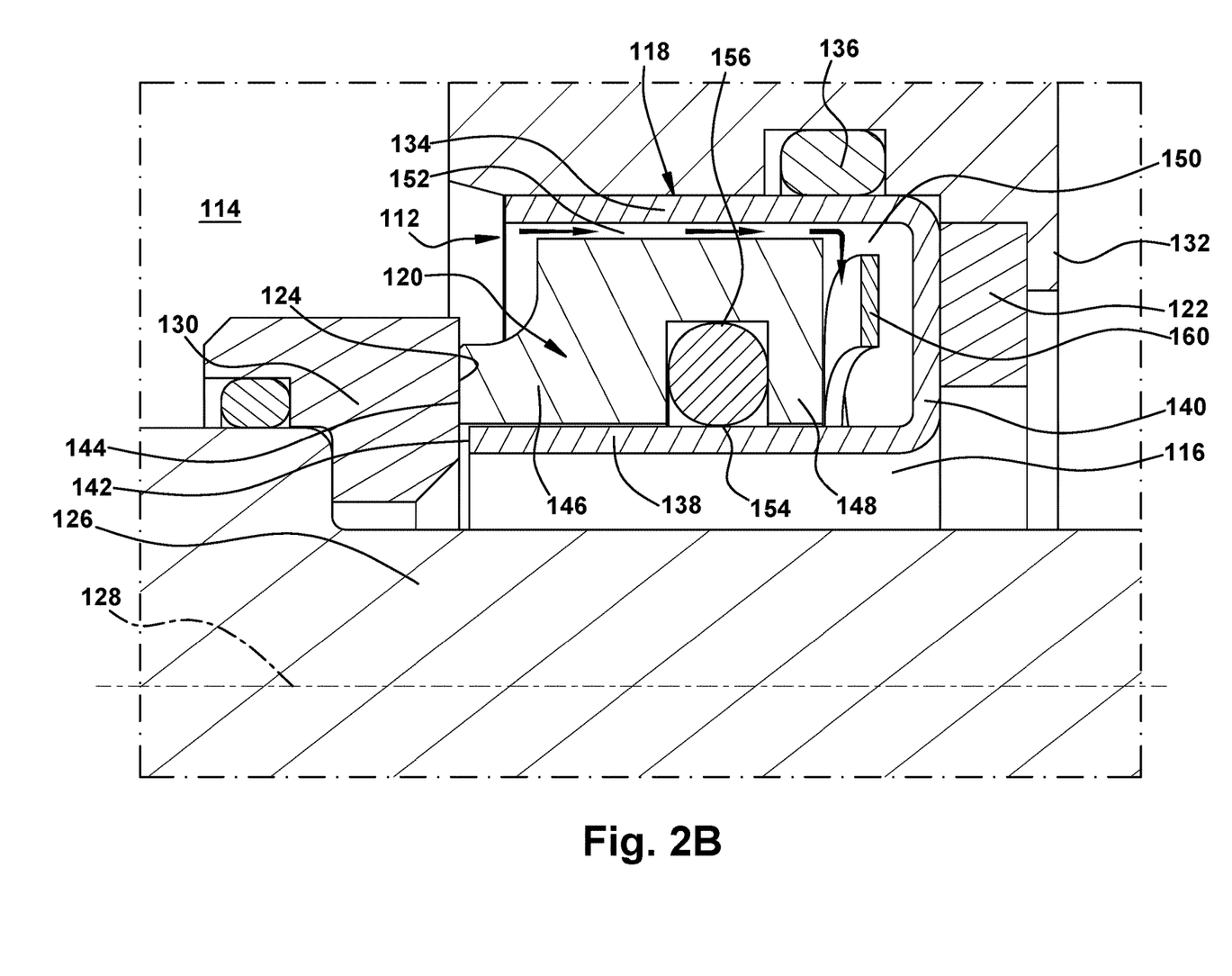
FIG. 2B is a partial cross-sectional view of the shaft seal assembly in FIG. 2A, which is now shown in an exemplary dynamic state.

FIGS. 2A and 2B show an exemplary shaft seal assembly 112 according to an embodiment of the present disclosure. FIG. 2A shows the shaft seal assembly 112 in an exemplary static state (e.g., when the pump is off or idle, and consequently fluid pressure and/or shaft speed are low/decreased). FIG. 2B shows the shaft seal assembly 112 in an exemplary dynamic state (e.g., normal pump operation, and consequently fluid pressure and/or shaft speed are high/increased). In the illustrated embodiment, the shaft seal assembly 112 is adapted to replace the conventional shaft seal assembly 12, and thus can be retrofit into the conventional pump 10 shown in FIG. 1B to seal between a fluid-side 114 and a side 116 other than the fluid-side (e.g., a non-fluid side 116 or other fluid-side 116). In the illustrated embodiment, the side 116 is a non-fluid side (e.g., ambient condition). As noted above, however, the shaft seal assembly 112 may be usable in any fluid consumer having a movable shaft in which it is desirable to seal between a fluid-side and another side (e.g., ambient or other fluid) of the consumer.

As shown, the exemplary shaft seal assembly 112 generally includes a seal case 118 that at least partially contains a seal 120, and a biasing member 122 that is configured to operatively bias and move the seal case 118 such that a sealing surface of the seal case 118 can form a static seal with a mating surface 124 of the shaft 126 when a certain threshold condition is met (e.g., fluid pressure and/or shaft speed are below a threshold condition), as shown in FIG. 2A, for example. The seal case 118 is movable relative to the mating surface 124 of the shaft, such that the seal case 118 can sealingly separate from the mating surface 124 when a threshold condition is met (e.g., fluid pressure and/or shaft speed are at or above a threshold condition), and such that the seal 120 sealingly engages against the mating surface 124 to form a dynamic seal, as shown in FIG. 2B, for example.

The shaft 126 and its mating surface 124 may be any suitable structures according to the operation of the fluid consumer. For example, the shaft 126 may be a rotary shaft that is rotatable about a longitudinal axis 128, as shown, or could be a reciprocating shaft or other movable member of the consumer. The mating surface 124 may be part of a component removably coupled to the shaft as a replaceable wear component 130, as shown, or could be an integral and unitary surface of the shaft. In the illustrated embodiment, the shaft 126 is the drive shaft of the pump 10 and the mating surface 124 is formed by a mating ring 130 fixedly coupled to the shaft 126 for co-rotation therewith.

The shaft seal assembly 112 may be mountable in any suitable manner at any suitable location in the fluid consumer to restrict leakage from the fluid-side 114 to the other side (e.g., non-fluid side) 116. In the illustrated embodiment, the shaft seal assembly 112 is mounted in an annular space inside a housing 132 of the consumer (e.g., pump 10) between the fluid-side 114 and the other side 116 to prevent leakage externally of the consumer. The views shown in FIGS. 2A and 2B are partial cross-sectional views, and it is understood that the exemplary shaft seal assembly 112 may at least partially or wholly surround the shaft 126 about axis 128 when installed in the annular space. In the illustrated embodiment, an outer wall 134 of the seal case 118 has an outer diameter that is closely matched to the inner diameter of the portion of the housing 132 forming the annular space so that the shaft seal assembly 112 is supported by the housing 132 in the annular space. As shown, the shaft seal assembly 112 may sealingly interface with one or more seals 136 disposed in seal grooves of the housing 132 (or other surface) to restrict fluid leakage around the outside of the seal case 118.

The seal case 118 may be made of any suitable material in any suitable configuration for supporting the seal 120 and permitting movement of the seal case 118 relative to the mating surface 124 of the shaft. In exemplary embodiments, the seal case 118 includes radially outer wall 134, radially inner wall 138, and a back wall 140 that form an annular space for containing the seal 120, and optionally any other components therein. In the illustrated embodiment, the seal case 118 forms a generally U-shaped structure in cross-section that is open toward the fluid-side 114 and surrounds the entirety of the shaft 126 about the longitudinal axis 128. As noted above, the radially outer wall 134 may be configured to provide a close fit with the radially inner surface of the housing to provide support and/or sealing, and the radially inner wall 138 may be spaced apart from the shaft 126 to prevent rubbing and wear.

As shown in FIG. 2A, and discussed above, the seal case 118 is movable relative to mating surface 124 of the shaft (and thus the housing 132 in the illustrated embodiment), such that a sealing surface of the seal case 118 sealingly engages with the mating surface 124 in a static state of the consumer. In the illustrated embodiment, the seal case 118 is axially movable relative to an axially facing mating surface 124 of the mating ring 130 to provide such sealing engagement. As discussed in further detail below, the exemplary seal case 118 is movable in response to force differentials from fluid pressure from the fluid-side 114 and biasing force from the biasing member 122 that is configured to urge the seal case 118 toward the mating surface 124 of the shaft.

To provide a suitable static seal with a sealing surface 142 of the seal case 118, the seal case 118 may be made of, or incorporate, a suitable sealing material. For example, in the illustrated embodiment, an end face of the radially inner wall 138 is the sealing surface 142 configured to sealingly engage against the mating surface 124 of the shaft to form the static seal. This part of the seal case 118, or the entire seal case, may be made of the sealing material, which may be a suitable polymer, metal, ceramic, composite, or combination thereof. For example, in the illustrated embodiment, the seal case 118 may be made of polytetrafluoroethylene (PTFE) or other like polymer which provides sufficient rigidity to support the seal 120 and withstand loads from fluid pressure and the biasing member 122, and which also can form a sealing interface with the mating surface 124 of the shaft. In other embodiments, the seal case 118 may hold a separate seal as the sealing surface 142. For example, a sealing material could cover the end face of the radially inner wall 138 of the seal case 118, or the seal case 118 could have a seal groove that holds the separate seal, such as an elastomeric O-ring seal, for example.

The seal 120 contained in the seal case 118 may be made of any suitable material in any suitable configuration for establishing the dynamic seal with the mating surface 124 of the shaft (as shown in FIG. 2B, for example), and preferably also an additional static seal in the static state (as shown in FIG. 2A, for example). In exemplary embodiments, the seal 120 is a face seal having a flat end face 144 for engaging the flat mating surface 124 of the mating ring 130 coupled to the shaft 126. In the illustrated embodiment, the seal 120 is configured as a nose seal having a projecting nose portion 146 that is configured to interface with the mating surface, and a radially enlarged portion 148 that more fully fills the annular space formed by the inside of the seal case 118. The seal 120 may be made of, or include, a suitable sealing material for providing the dynamic seal, which may be a suitable polymer, metal, ceramic, composite, or combination thereof. In the illustrated embodiment, for example, the seal 120 is made of bronze which provides good dynamic sealing with minimal friction and wear with the mating surface 124 of the shaft.

The biasing member 122 may be any suitable device at any suitable location that applies a biasing force to the seal case 118 to urge the seal case toward the mating surface 124 of the shaft for establishing the static seal therebetween. In exemplary embodiments, the biasing member 122 is a spring, such as a spring washer (e.g., Bellville or conical washer), coil spring, leaf spring; or any other suitable resilient member or device made of any suitable material. In the illustrated embodiment, the biasing member 122 is located behind the back wall 140 of the seal case 118 in the annular space of the housing 132. As shown in FIG. 2A, the biasing member 122 (e.g., spring) is extended in the illustrated static state to push the seal case 118 against the mating surface 124 of the shaft to form the static seal. As shown in FIG. 2B, the biasing member 122 (e.g., spring) is compressed in the illustrated dynamic state such that the seal case 118 is sealingly separated from the mating surface 124 so as to not increase wear in the dynamic state. In such a dynamic state, the sealing surface 144 of the seal case 118 may be spaced apart from or may be lightly touching the mating surface 124 to provide such separation that does not result in sealing and also does not result in excessive wear.

As noted above, the exemplary shaft seal assembly 112 is operative to transition between the static and dynamic states in response to force differentials from fluid pressure from the fluid-side 114 and biasing force from the biasing member 122. As shown in the illustrated embodiment, the seal case 118 is actuated by the biasing member 122, which is disposed outside of the seal case 118 to force the seal case in an axial direction (e.g., to the left in the illustration) toward the mating surface 124. The seal case 118 is adapted to receive fluid from the fluid-side 114 of the consumer which communicates fluid pressure that exerts a force opposite the force of the biasing member 122. Based upon the force differentials, the selection of the biasing force of the biasing member 122 may at least partially set a threshold condition in which the seal case 118 is engaged with or disengaged from the mating surface 124 of the shaft in response to the fluid pressure.

In the illustrated embodiment, the fluid from the fluid-side 114 can flow through the opening in the seal case 118 and into a fluid chamber 150 between the seal 120 and the back wall 140 of the seal case to exert the fluid force against the back wall 140 opposite the biasing force from the biasing member 122. In exemplary embodiments, the fluid may flow across the seal 120 via one or more axial grooves 152 in the seal 120 (or channel across the seal 120), as depicted by the flow lines in FIG. 2B, for example. The seal 120 includes a sealing surface 154 that restricts the fluid from the fluid chamber 150 leaking to the other side (e.g., non-fluid side) 116. In the illustrated embodiment, the sealing surface 154 is via an additional seal 156 disposed within a radial groove of the seal 120. The additional seal 156 may be any suitable type of seal, such as an elastomeric O-ring seal.

As depicted in FIG. 2A, in a state when the fluid pressure is low, such as when the fluid consumer is idle or off, the biasing force of the biasing member 122 exceeds the force from fluid pressure in the fluid chamber 150 of the seal case 118. As such, the biasing member 122 (e.g., spring) is extended in this condition which causes the seal case 118 to sealingly engage the mating surface 124 of the shaft to create a static seal at the seal interface between the seal surface 142 of the seal case 118 and the mating surface 124. In such a static state, the fluid pressure from the fluid-side 114 of the consumer (and thus in the fluid chamber 150) may be in a range from about 0 psig to about 90 psig, for example. In exemplary embodiments, the minimum biasing force (e.g., spring force) of the biasing member 122 is set based on seal case 118 material properties or geometric constraints of housing 132 to establish the static seal. Essentially, it may be desirable to have the minimum force as high as practical, as this is the force that is applied from seal case 118 to mating surface 142 (as pressure increases the spring force increases as the spring is compressed). The upper limit to the maximum force may be deformation of the seal case 118 or spring size that can fit in the envelope.

As noted above, the seal 120 disposed in the seal case 118 also may provide an additional static seal interface with the mating surface 124 of the shaft, as shown in FIG. 2A. In exemplary embodiments, the seal 120 may be sized such that when the seal case 118 sealingly engages the mating surface 124, the back wall 140 of the seal case also pushes the seal 120 against the mating surface 124 to establish the additional static seal. In alternative embodiments, another component, such as a biasing member, spacer, packing, or the like, may be disposed in the fluid chamber 150 behind the seal 120 to provide an operative connection between the biasing force of the biasing member 122 and the seal 120 to provide the static seal, as shown in FIG. 2A for example. In the illustrated embodiment, for example, another biasing member 160 (e.g., spring) is disposed in the fluid chamber 150 behind the seal 122 to provide a biasing force that exerts sufficient sealing pressure to establish the static seal.

As depicted in FIG. 2B, in a state when the fluid pressure is elevated, such as when the fluid consumer is on or in a normal operating state, the fluid pressure in the fluid chamber 150 of the seal case 118 exceeds the biasing force of the biasing member 122, thereby causing the biasing member 122 to compress and the seal case 118 to sealingly separate from the mating surface 124 of the shaft to minimize wear. The fluid pressure in the fluid chamber 150 pushes the backside of the seal 120 such that the sealing surface 144 of the seal 120 sealingly interfaces against the mating surface 124 of the shaft to create a suitable dynamic seal. In such a dynamic state, the fluid pressure from the fluid-side 114 of the consumer (and thus in the fluid chamber 150) may be in a range from about 90 psig to about 200 psig, for example. The area of the seal case 118 exposed to fluid pressure and the biasing force of the biasing member 122 are respectively configured to cooperate with each other such that the force from fluid pressure can overcome the biasing force at the desired threshold pressure (e.g., operating pressure) to thereby sealingly separate the seal case 118 from the mating surface 124 during the dynamic condition. The area of the seal case 118 and the area of the seal 120 exposed to fluid pressure also are respectively configured such that the force from fluid pressure at the desired threshold pressure (e.g., operating pressure) pushes the seal surface 144 of the seal 120 into sealing engagement with the mating surface 124 of the shaft during the dynamic condition.

Figure 3:
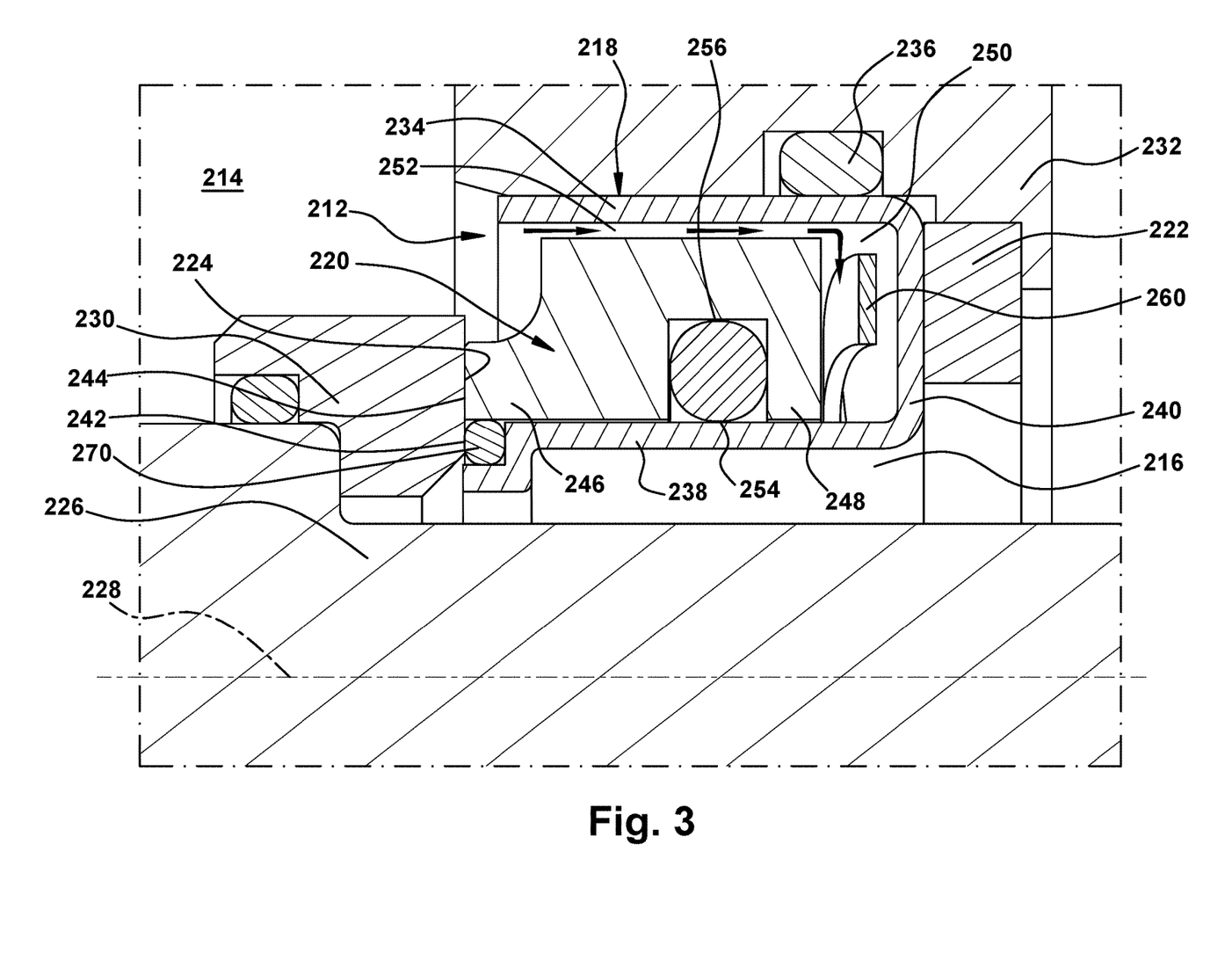
FIG. 3 is a partial cross-sectional view of another exemplary shaft seal assembly according to an embodiment of the present disclosure.
Figure 4:
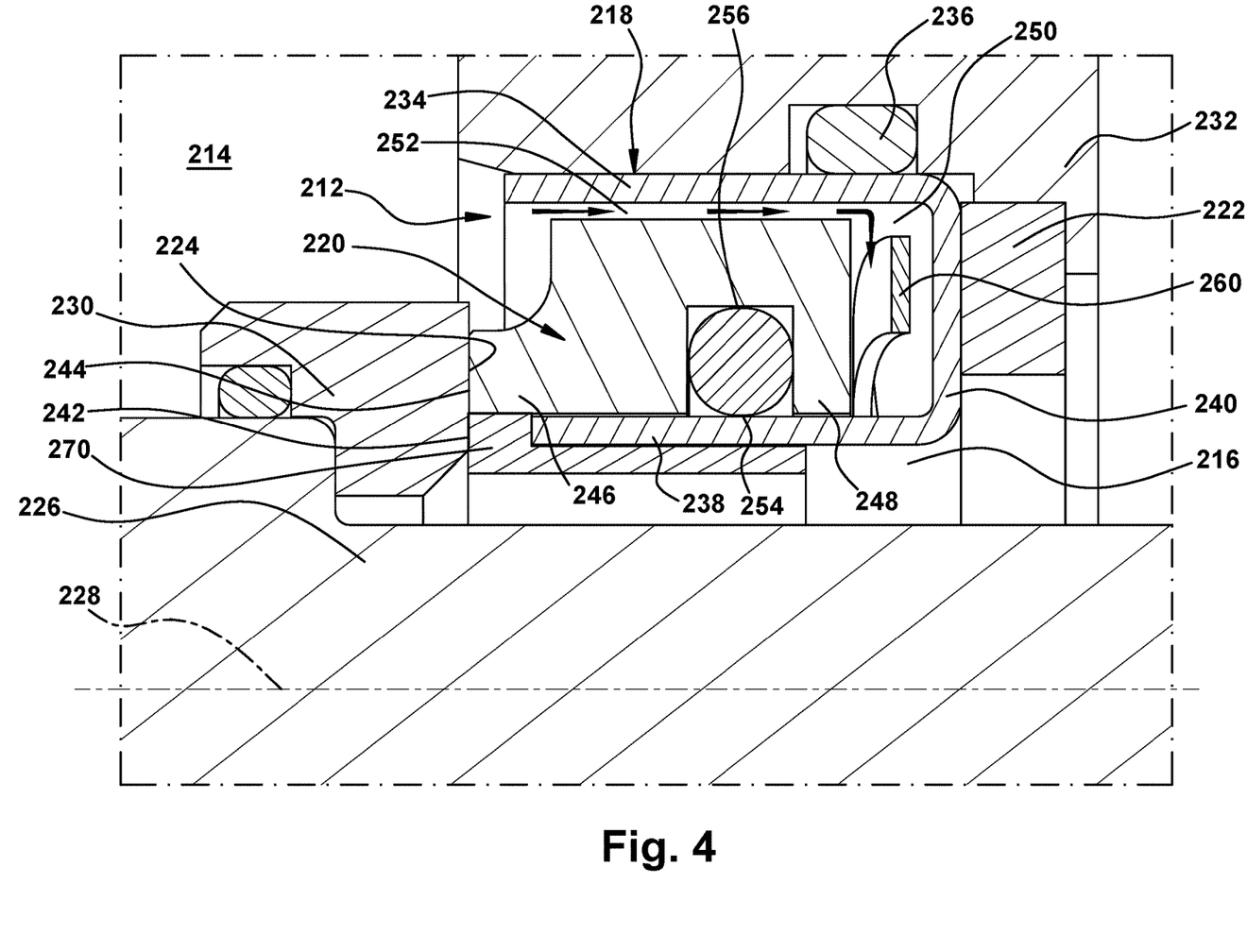
FIG. 4 is a partial cross-sectional view of another exemplary shaft seal assembly according to an embodiment of the present disclosure.

Turning now to FIGS. 3 and 4, other exemplary embodiments of a shaft seal assembly 212 are shown. The shaft seal assembly 212 is substantially the same as the above-referenced shaft seal assembly 112, and consequently the same reference numerals but in the 200-series are used to denote structures corresponding to similar structures between the shaft seal assemblies 112, 212. In addition, the foregoing description of the shaft seal assembly 112 is equally applicable to the shaft seal assembly 212 except as noted below. It is understood that aspects of the shaft seal assemblies 112, 212 may be substituted for one another or used in conjunction with one another where applicable.

In the illustrated embodiments, the shaft seal assembly 212 differs from the shaft seal assembly 112 in that the seal case 218 uses a separate (discrete) seal 270 as the sealing surface 242 of the seal case 218 instead of a portion of the seal case itself. As shown in FIG. 3, the seal case 218 may have a seal groove that contains the separate seal 270. As shown in FIG. 3, the separate seal 270 may be made of any suitable material in any suitable configuration, such as an elastomeric O-ring seal (as shown), or a PTFE insert or packing, for example. As shown in FIG. 4, the separate seal 270 is formed as an insert, such as a PTFE insert.

Figure 5:
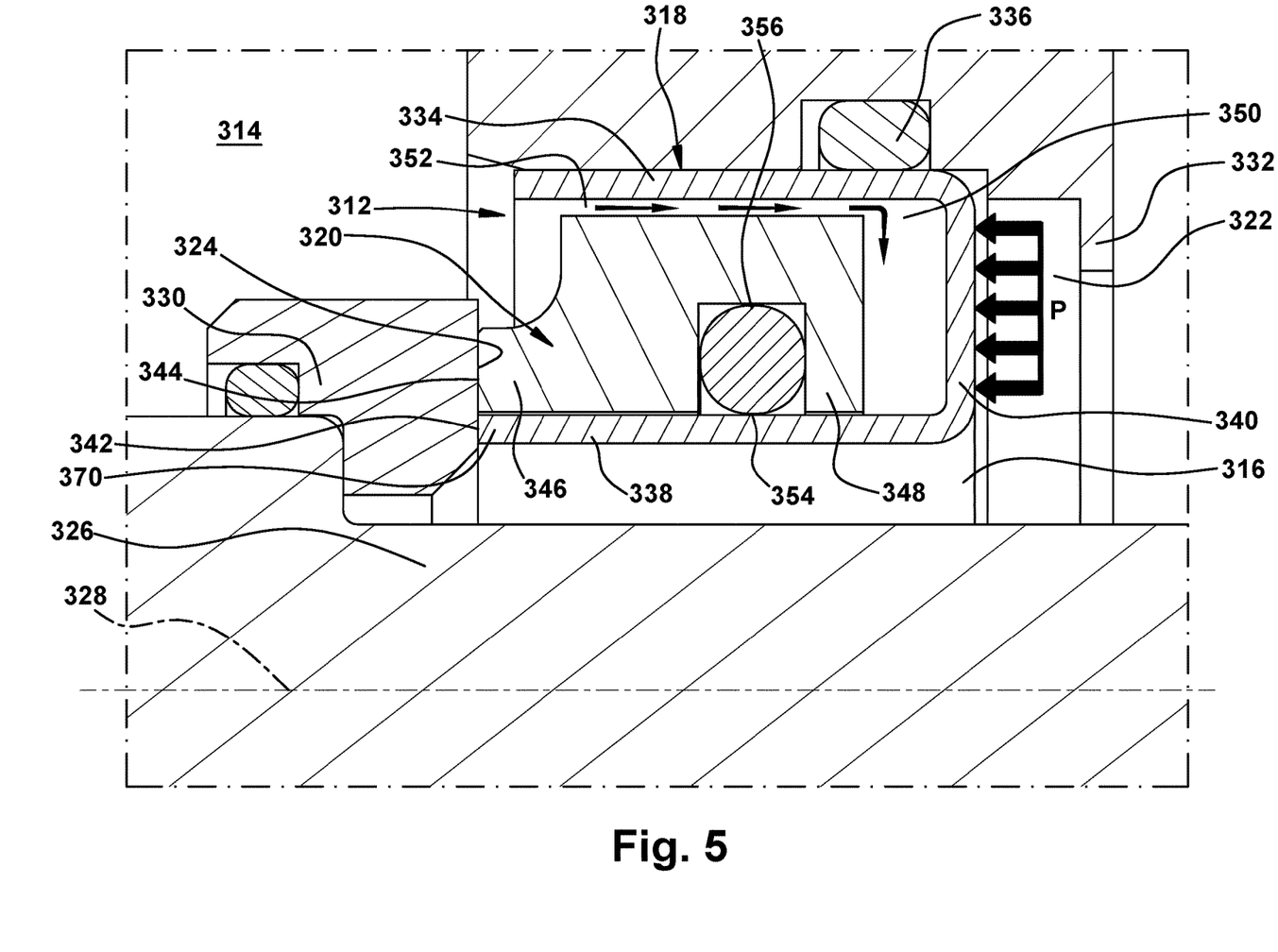
FIG. 5 is a partial cross-sectional view of another exemplary shaft seal assembly according to an embodiment of the present disclosure

Turning now to FIG. 5, another exemplary embodiment of a shaft seal assembly 312 is shown. The shaft seal assembly 312 is substantially the same as the above-referenced shaft seal assembly 112, and consequently the same reference numerals but in the 300-series are used to denote structures corresponding to similar structures between the shaft seal assemblies 112, 312. In addition, the foregoing description of the shaft seal assemblies 112 and 212 is equally applicable to the shaft seal assembly 312 except as noted below. It is understood that aspects of the shaft seal assemblies 112, 212, 312 may be substituted for one another or used in conjunction with one another where applicable.

In the illustrated embodiments, the shaft seal assembly 312 differs from the shaft seal assembly 112, in that, the biasing force on the side 316 (opposite the fluid-side 314) is provided by a source of fluid pressure 322 instead of biasing member 122. The operation of the shaft seal assembly 312 is substantially the same when using the other fluid force 322 as the biasing force, which may set a threshold pressure for engagement/disengagement as discussed above. In particular, when the fluid force from fluid-side 314 overcomes the biasing force (fluid force) 322 from other fluid side 316, then the seal case 318 sealingly separates from mating surface 324 of the shaft, and the fluid pressure from the fluid-side 314 also exerts a force against the seal 320 that forces the seal 320 into sealing engagement against the mating surface 324 of the shaft to form a dynamic seal. When fluid pressure from the fluid-side 314 is less than the biasing force (fluid force) 322 from side 316, then the seal 320 is sealingly engaged against the mating surface 324 of the shaft to form a static seal, and the biasing force 322 overcomes the fluid force against the case 318 from fluid-side 314, such that sealing surface 342 of the seal case 318 is sealingly engaged against the mating surface 324 of the shaft to form an additional static seal.

An exemplary shaft seal assembly for sealing a moving shaft of a fluid consumer has been described herein. The shaft seal assembly includes a seal case movable relative to a mating surface of the shaft, a biasing force that biases the seal case towards the mating surface of the shaft, and a seal at least partially disposed in the seal case. In a dynamic condition, when fluid pressure exerted against the seal case is equal to or greater than a threshold pressure, the seal case sealingly separates from the mating surface of the shaft, and the seal is forced into sealing engagement against the mating surface of the shaft to form a dynamic seal. In a static condition, when fluid pressure exerted against the seal case is less than the threshold pressure, the seal is sealingly engaged against the mating surface to form a static seal, and the seal case is sealingly engaged against the mating surface of the shaft to form an additional static seal.

According to an aspect, a fluid consumer includes: a housing for containing an operating fluid; a shaft movable relative to the housing; and a shaft seal assembly configured to seal against a mating surface of the shaft to restrict leakage from a fluid-side of the consumer, the shaft seal assembly comprising: a seal case movable relative to the mating surface of the shaft; a biasing force that biases the seal case towards the mating surface of the shaft; and a seal at least partially disposed in the seal case, the seal being configured to seal against the mating surface of the shaft; wherein the consumer is configured such that: when in use, fluid pressure from the fluid-side exerts a fluid force against the seal case that is opposite the biasing force, when fluid pressure exerted against the seal case is equal to or greater than a threshold pressure, (i) the fluid force against the seal case overcomes the biasing force such that the seal case sealingly separates from mating surface of the shaft, and (ii) the fluid pressure from the fluid-side also exerts a force against the seal that forces the seal into sealing engagement against the mating surface of the shaft to form a dynamic seal; and when fluid pressure exerted against the seal case is less than the threshold pressure, (i) the seal is sealingly engaged against the mating surface of the shaft to form a static seal, and (ii) the biasing force overcomes the fluid force against the seal case, such that a sealing surface of the seal case is sealingly engaged against the mating surface of the shaft to form an additional static seal.

Embodiments may include one or more of the following additional features, separately or in any combination.

In some embodiments, the biasing force is provided by a biasing member.

In some embodiments, the biasing member is a biasing spring.

In some embodiments, the biasing force is provided by a source of fluid pressure opposite the fluid-side pressure.

In some embodiments, the movable seal case has an interior portion and an exterior portion; and wherein fluid pressure in the interior portion supplies at least part of the fluid force that is opposite the biasing force.

In some embodiments, the biasing member is located outside of the interior portion of the seal case.

In some embodiments, the seal case includes a wall that at least partially forms an internal fluid chamber of the seal case, the internal fluid chamber configured to contain fluid from the fluid-side in which the fluid force is exerted in a first direction against the wall.

In some embodiments, the biasing member is mounted outside of the seal case on an opposite side of the wall as the fluid chamber, and the biasing member is configured to exert the biasing force against the wall in a second direction opposite the first direction.

In some embodiments, the wall is a backwall that is connected to a radially inner wall and a radially outer wall, wherein the internal fluid chamber is between the backwall and a backside of the seal, and wherein the seal includes one or more fluid passages that communicate fluid from the fluid-side to the internal fluid chamber.

In some embodiments, the threshold pressure is based at least partially upon the biasing force of the biasing member and an area of the seal case exposed to the fluid pressure.

In some embodiments, the biasing member is a spring.

In some embodiments, the seal case includes a radially inner wall, a radially outer wall, and a back wall connecting the radially inner and outer walls, the respective walls having an interior portion and an exterior portion, the interior portion forming an annular channel that at least partially contains the seal; and wherein the radially inner wall has an end face including a sealing surface for engaging the mating surface of the shaft to form the static seal.

In some embodiments, the seal case is made of a material that forms the sealing surface and enables sealing engagement with the mating surface to provide the static seal.

In some embodiments, the sealing surface of the seal case is formed by part of a separate seal that is operatively coupled to the seal case.

In some embodiments, the separate seal is an elastomeric O-ring seal.

In some embodiments, the seal at least partially disposed in the seal case is a nose seal having an axially projecting nose portion and a radially enlarged portion axially offset from the nose portion, the nose portion having a flat sealing surface that is configured to sealingly engage the mating surface of the shaft.

In some embodiments, the seal at least partially disposed in the seal case includes a radial seal groove that contains a separate seal that sealingly engages an interior surface of the seal case.

In some embodiments, the shaft seal assembly further includes a second biasing member located in a chamber between a wall of the seal case and the seal, the second biasing member being configured to apply a biasing force to the seal to at least partially form the static seal.

In some embodiments, the shaft seal assembly is mounted in an annular space of the housing of the fluid consumer that surrounds the shaft about a longitudinal axis of the shaft.

In some embodiments, the fluid consumer is a hydraulic pump.

According to another aspect, a shaft seal assembly for sealing against a mating surface of a movable shaft of a fluid consumer includes: a seal case moveably mountable relative to the mating surface of the shaft; and a seal at least partially disposed in the seal case, the seal being configured to seal against the mating surface of the shaft; wherein the shaft seal assembly is configured such that: when fluid pressure exerted against the seal case is less than a threshold pressure, the seal case sealingly engages the mating surface of the shaft to provide a static seal; and when fluid pressure exerted against the seal case is equal to or greater than the threshold pressure, the seal case is sealingly separated from the mating surface of the shaft and the seal sealingly engages the mating surface of the shaft to provide a dynamic seal.

Embodiments may include one or more of the foregoing or following additional features, separately or in any combination.

In some embodiments, when fluid pressure exerted against the seal case is less than the threshold pressure, the seal sealingly engages against the mating surface to form an additional static seal.

According to another aspect, a shaft seal assembly for sealing against a mating surface of a movable shaft of a fluid consumer includes: a seal case moveably mountable relative to the mating surface of the shaft, the seal case including a radially inner wall, a radially outer wall, and a back wall connecting the radially inner and outer walls, the respective walls having an interior portion and an exterior portion, the interior portion forming an annular channel, wherein the radially inner wall has an end face including a sealing surface for engaging the mating surface of the shaft; a spring configured to exert a spring force against the seal case, the spring being mountable outside of interior portion of the seal case to operatively engage the back wall of the seal case for biasing the seal case towards the mating surface of the shaft; and a nose seal at least partially disposed in the seal case, the nose seal having an axially projecting nose portion and a radially enlarged portion axially offset from the nose portion, the nose portion having a flat sealing surface that is configured to sealingly engage the mating surface of the shaft, and the enlarged portion forming at least one passage for communicating fluid to an internal fluid chamber formed between a backside of the seal and the back wall of the seal case.

Embodiments may include one or more of the foregoing or following additional features, separately or in any combination.

In some embodiments, the nose seal includes a radial seal groove that contains a separate seal that sealingly engages an interior surface of the seal case to restrict leakage of fluid from the internal fluid chamber.

As used herein, an "operative" connection or coupling, or a connection by which entities are "operatively" connected, is one in which the entities are connected in such a way that the entities may perform as intended. An operative connection may be a direct connection or an indirect connection in which an intermediate entity or entities cooperate or otherwise are part of the connection or are in between the operably connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid consumer comprising:
a housing for containing an operating fluid;
a shaft movable relative to the housing; and
a shaft seal assembly configured to seal against a mating surface of the shaft to restrict leakage from a fluid-side of the consumer, the shaft seal assembly comprising:
a seal case movable relative to the mating surface of the shaft;
a biasing force that biases the seal case towards the mating surface of the shaft; and
a seal at least partially disposed in the seal case, the seal being configured to seal against the mating surface of the shaft;
wherein the consumer is configured such that:
when in use, fluid pressure from the fluid-side exerts a fluid force against the seal case that is opposite the biasing force,
when fluid pressure exerted against the seal case is equal to or greater than a threshold pressure, (i) the fluid force against the seal case overcomes the biasing force such that the seal case sealingly separates from mating surface of the shaft, and (ii) the fluid pressure from the fluid-side also exerts a force against the seal that forces the seal into sealing engagement against the mating surface of the shaft to form a dynamic seal; and
when fluid pressure exerted against the seal case is less than the threshold pressure, (i) the seal is sealingly engaged against the mating surface of the shaft to form a static seal, and (ii) the biasing force overcomes the fluid force against the seal case, such that a sealing surface of the seal case is sealingly engaged against the mating surface of the shaft to form an additional static seal.

2. The fluid consumer according to claim 1,
wherein the biasing force is provided by a biasing member; or
wherein the biasing force is provided by a source of fluid pressure.

3. The fluid consumer according to claim 1,
wherein the movable seal case has an interior portion and an exterior portion; and
wherein fluid pressure in the interior portion supplies at least part of the fluid force that is opposite the biasing force.

4. The fluid consumer according to claim 2,
wherein the biasing member is located outside of the interior portion of the seal case.

5. The fluid consumer according to claim 2,
wherein the seal case includes a wall that at least partially forms an internal fluid chamber of the seal case, the internal fluid chamber configured to contain fluid from the fluid-side in which the fluid force is exerted in a first direction against the wall, and
wherein the biasing member is mounted outside of the seal case on an opposite side of the wall as the fluid chamber, and the biasing member is configured to exert the biasing force against the wall in a second direction opposite the first direction.

6. The fluid consumer according to claim 2,
wherein the threshold pressure is based at least partially upon the biasing force of the biasing member and an area of the seal case exposed to the fluid pressure.

7. The fluid consumer according to claim 2,
wherein the biasing member is a spring.

8. The fluid consumer according to claim 1,
wherein the seal case includes a radially inner wall, a radially outer wall, and a back wall connecting the radially inner and outer walls, the respective walls having an interior portion and an exterior portion, the interior portion forming an annular channel that at least partially contains the seal; and
wherein the radially inner wall has an end face which includes the sealing surface that engages the mating surface of the shaft to form the static seal.

9. The fluid consumer according to claim 8,
wherein the seal case is made of a material that forms the sealing surface and the seal case enables sealing engagement with the mating surface to provide the static seal.

10. The fluid consumer according to claim 1,
wherein the sealing surface of the seal case includes a separate seal that is operatively coupled to the seal case.

11. The fluid consumer according to claim 1,
wherein the seal at least partially disposed in the seal case is a nose seal having an axially projecting nose portion and a radially enlarged portion axially offset from the nose portion, the nose portion having a flat sealing surface that is configured to sealingly engage the mating surface of the shaft.

12. The fluid consumer according to claim 1, wherein the seal at least partially disposed in the seal case includes a radial seal groove that contains a separate seal that sealingly engages an interior surface of the seal case.

13. The fluid consumer according to claim 1, wherein the shaft seal assembly further includes a second biasing member located in a chamber between a wall of the seal case and the seal, the second biasing member being configured to apply a biasing force to the seal to at least partially form the static seal.

14. The fluid consumer according to claim 1, wherein the shaft seal assembly is mounted in an annular space of the housing of the fluid consumer that surrounds the shaft about a longitudinal axis of the shaft.

15. The fluid consumer according to claim 1, wherein the fluid consumer is a hydraulic pump.

* * * * *